United States Patent [19]
Wild et al.

[11] Patent Number: 5,862,480
[45] Date of Patent: *Jan. 19, 1999

[54] METHOD AND APPARATUS FOR MANAGING SERVICE ACCESSIBILITY BETWEEN DIFFERING RADIO TELECOMMUNICATION NETWORKS

[75] Inventors: Johanna Alexandra Wild, Scottsdale; Daniel Richard Tayloe, Phoenix; James William Bishop, Jr., Chandler, all of Ariz.; William Neil Robinson, Farnham, United Kingdom

[73] Assignee: Motorola, Inc., Schaumburg, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 578,760

[22] Filed: Dec. 26, 1995

[51] Int. Cl.$^6$ .............................. H04Q 7/20; H04B 7/185
[52] U.S. Cl. ...................... 455/432; 455/13.1; 455/517; 455/435
[58] Field of Search .................................. 455/33.1, 54.1, 455/54.2, 56.1, 67.1, 33.4, 12.1, 13.1, 53.1, 89, 34.1, 426, 427, 428, 432, 433, 435, 443, 515, 517; 379/58, 59, 60; 370/401, 462, 316; 395/200.06, 200.12

[56] References Cited

U.S. PATENT DOCUMENTS

| | | | |
|---|---|---|---|
| 5,301,359 | 4/1994 | Van Den Heuvel | 455/56.1 |
| 5,355,517 | 10/1994 | Olson | 455/54.2 |
| 5,363,427 | 11/1994 | Elkstrom et al. | 379/58 |
| 5,412,375 | 5/1995 | Wood | 455/33.1 |
| 5,428,666 | 6/1995 | Fyfe et al. | 455/432 |
| 5,448,623 | 9/1995 | Wiedeman et al. | 379/59 |
| 5,523,997 | 6/1996 | Bishop, Jr. | 455/13.1 |
| 5,546,445 | 8/1996 | Dennison et al. | 379/60 |
| 5,548,631 | 8/1996 | Krebs et al. | 455/34.1 |
| 5,561,836 | 10/1996 | Sowles et al. | 455/12.1 |
| 5,574,728 | 11/1996 | Mamaghani et al. | 370/462 |
| 5,581,802 | 12/1996 | Erickson et al. | 455/33.1 |
| 5,610,973 | 3/1997 | Comer | 455/432 |

*Primary Examiner*—Reinhard J. Eisenzopf
*Assistant Examiner*—Lester G. Kincaid
*Attorney, Agent, or Firm*—Sherry J. Whitney; Jennifer B. Wuamett

[57] ABSTRACT

A method for a network in a multi-network system to obtain access information for a subscriber unit (104) (SU) involves requesting (1306) access information from an access server (110) which determines (1208) whether a group to which the SU belongs can access the network or another network from the SU location. The access server (110) can also send (1228) information to a network which describes which other networks the SU group can access from the SU location. An access server apparatus (1800) includes a processor (1802) for making access decisions in a multi-network system, a memory device (1804) for storing access information (1100) for various networks, and at least one network interface (1806). A gateway (GW) apparatus (2000) contacts an access server (110) to obtain access information. An SU apparatus (1900) includes a processor (1902) for using information from the access server (110) to access a network.

41 Claims, 11 Drawing Sheets

FIG. 9
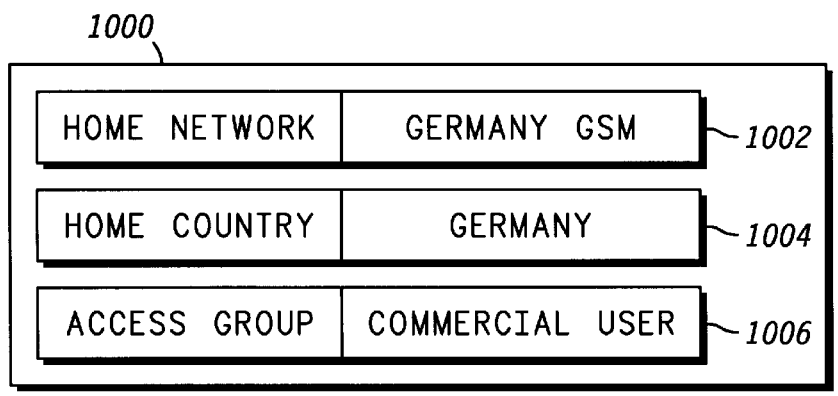
FIG. 10
FIG. 11
| ACCESS CODE / SU LOCATION | HN=GERMANY GSM HC=GERMANY AG=COMMERCIAL USER | HN=SPAIN GSM HC=FRANCE AG=NETWORK OPERATOR | HN=JAPAN GSM HC=JAPAN AG=EMERGENCY |
|---|---|---|---|
| CHINA | PERMIT | PERMIT | PERMIT |
| RUSSIA | RESTRICT | PERMIT | PERMIT |
| CANADA | PERMIT | RESTRICT | PERMIT |
| NIGERIA | RESTRICT | RESTRICT | PERMIT |
| GERMANY | PERMIT | PERMIT | PERMIT |

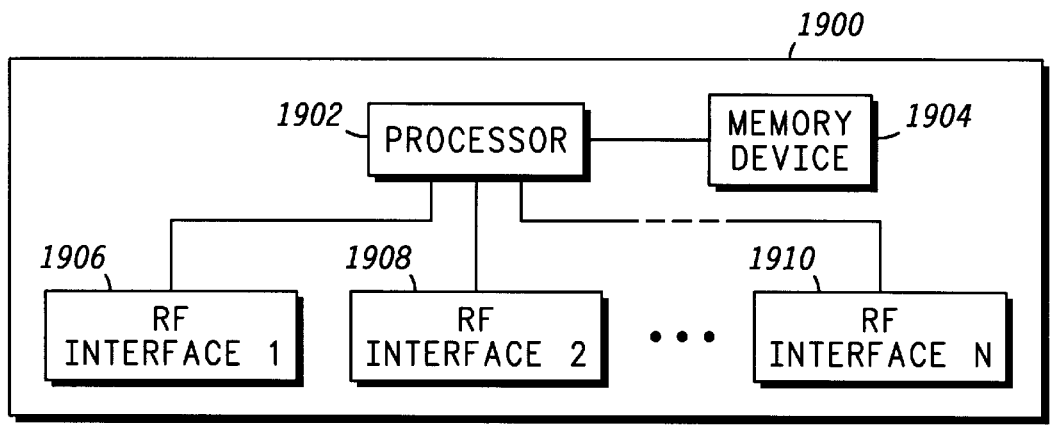
FIG. 19
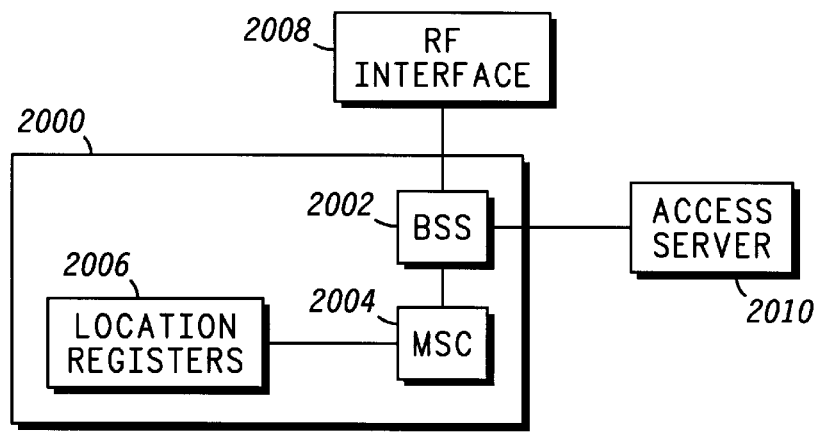
FIG. 20
FIG. 21
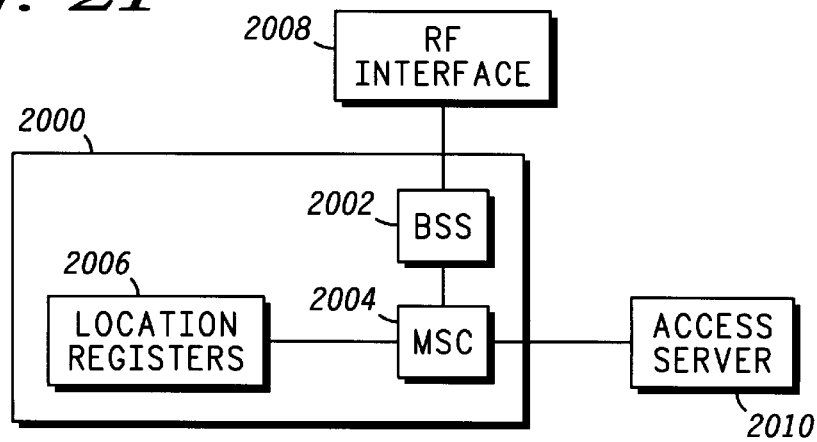

METHOD AND APPARATUS FOR MANAGING SERVICE ACCESSIBILITY BETWEEN DIFFERING RADIO TELECOMMUNICATION NETWORKS

CROSS-REFERENCE TO RELATED APPLICATIONS

This invention is related to co-pending U.S. Patent Applications entitled "Method and Apparatus for Handing Off Calls Between Differing Radio Telecommunication Networks" (U.S. Pat. No. 5,826,188) and "Method and Apparatus for Providing Location Inter-Working Information Between Differing Radio Telecommunication Networks" (Ser. No. 08/568,902), filed on Dec. 5, 1995 and assigned to the same assignee as the present invention.

FIELD OF THE INVENTION

This invention relates generally to radio telecommunications and, more particularly, to determining service accessibility between multiple differing radio telecommunications networks.

BACKGROUND OF THE INVENTION

A "network" is defined herein as a particular radio telecommunication service provider, including its air interface standard. A "system" is defined herein as a combination of networks. An "air interface standard" is defined by a modulation scheme and frequency band employed by a particular network. The air interface used by various radio telecommunication networks differs. Common modulation schemes include TDMA, FDMA, CDMA, AMPS (analog cellular), and GSM. Frequency bands typically are in either the 900 MHz or 1900 MHz ranges.

As used herein, a "locational standard" or "location format" is the standard by which a particular network describes the location of a Subscriber Unit (SU). For example, some networks describe an SU location by using a latitude and longitude measurement, while other networks define an SU location by identifying a cell which the SU is located within. Networks often use differing locational standards to describe an SU location.

A variety of radio telecommunication networks have been developed to offer wider-coverage mobile communications. Terrestrial networks, such as the Global System for Mobile communications (GSM), provide communication cells to SUs using ground-based radio telecommunication equipment. More recently, satellite networks are being developed in which an SU communicates directly with a satellite which enables communications between the SU and the rest of the network.

Each communication network provides service to SUs within a particular coverage area. Terrestrial networks typically have coverage areas which are limited by physical obstructions and antenna expense. Thus, terrestrial networks are generally used in populated areas and along thoroughfares. Satellite networks are not as limited by physical obstructions or antenna expense. Thus, some proposed satellite networks intend to provide service to users across all or a substantial portion of the earth's surface.

The coverage areas of various communication networks often overlap, thus offering the potential for a particular SU to take advantage of multiple networks. For example, an SU might want to access an alternative network which offers a lower service rate, or the SU might want a call to be handed-off to another network when the SU leaves the coverage area of a particular network.

Typically, the air interfaces used by distinct radio telecommunication networks are incompatible. Most prior-art SUs can operate only with a single air interface standard. Thus, most prior-art SUs are generally capable of communicating using a single radio telecommunication network. Such a prior-art SUs would be unable to initiate a call using a TDMA network and later hand-off to a GSM network, for example.

Prior-art SUs which are capable of communicating over only a single air interface are unable to take advantage of the potential availability of multiple networks. To resolve this problem, "multi-mode" SUs are being developed which would enable an SU to operate using multiple air interfaces.

One way to enable a multi-mode SU to operate on multiple networks is described in U.S. Pat. No. 5,301,359 (Van den Heuvel et al.), which discloses a "bulletin board" communication resource which broadcasts a message describing available networks to multi-mode communication units. In response to the broadcast message, a communication unit can request, from the bulletin board, one of the available networks. The bulletin board resource then attempts to register the communication unit with the requested network and, if access to the network is allowed, sends a registration grant to the communication unit. If the communication unit can communicate using the network's RF interface, the communication unit can then begin operation using the requested network.

One problem facing inter-working networks is that locational standards are network-unique and there is no ability to translate between locational standards in the prior art. The invention described in Van den Heuval et al. does not address this problem.

Another problem not addressed by Van den Heuvel is that, when multi-mode SUs become commonplace, more networks will want to form agreements between themselves to provide service to each others' SUs. In addition, local networks are likely to experience significantly more access attempts from SUs from foreign networks. Further, networks which cover multiple geographical areas (e.g., global networks) will want to enforce possible licensing restrictions in specific geographical areas. The increase in network agreements will produce an additional level of complexity to the authentication procedure.

Because most prior-art SUs operate using a single air interface standard, prior-art SUs which use other radio telecommunication networks could easily be screened from a particular network. If an SU is incapable of using a network, the SU obviously is not authorized to use the network. However, with the advent of multi-mode SUs, SUs will not be able to be pre-screened based on the SUs ability to communicate using the network.

What is needed is a method and apparatus to enable an SU to communicate using differing networks wherein groups of unauthorized SUs are pre-screened from accessing a particular network. Further needed are SUs which can easily access multiple networks which use differing air interface standards and/or differing locational standards.

BRIEF DESCRIPTION OF THE DRAWINGS

FIG. 9 illustrates an SU access code in accordance with a preferred embodiment of the present invention;

FIG. 10 illustrates an SU access information database in accordance with a preferred embodiment of the present invention;

FIG. 11 illustrates network restriction database for a particular global or satellite network in accordance with a preferred embodiment of the present invention;

FIG. 19 illustrates a multi-mode SU in accordance with a preferred embodiment of the present invention;

FIG. 20 illustrates a GW in accordance with a preferred embodiment of the present invention; and FIG. 21 illustrates a GW in accordance with an alternate embodiment of the present invention.

DETAILED DESCRIPTION OF THE DRAWINGS

In a typical radio telecommunication network, an SU's first point of contact is a Base Station Subsystem (BSS). The BSS provides and manages transmission paths between SUs and the network's Mobile Switching Center (MSC). An MSC is a point where subscriber authentication is performed and where communications transit between the network and another network (e.g., a Public Switched Telephone Network (PSTN) or other communication network). To determine whether an SU is allowed to use the network's services, information identifying the SU is sent from the BSS to the network's MSC. After receiving information about the SU, the MSC performs an authentication procedure to determine whether the SU is authorized to use the network. For an SU in roaming mode, the MSC also determines whether the network and the SU's home network have an agreement in place which ensures that the network will receive compensation for service it provides to the SU.

The method and apparatus of the present invention enables a network to pre-screen a subscriber unit (SU) to determine whether the SU belongs to a group whose access is restricted by the network. In addition, the method and apparatus of the present invention enables an SU to access multiple networks which use differing air interface standards. Further provided is a method and apparatus for determining which of multiple, overlapping networks a multi-mode SU is allowed to use. The method and apparatus of the present invention applies to both a multi-mode SU and an SU which can communicate using only a single air interface.

In a preferred embodiment, a network contacts an access server prior to the network's subscriber authentication procedure. The access server is capable of determining whether an SU belongs to a group which is allowed to access the network (e.g., when the SU is in roaming mode or prior to a hand-off to a new network) before the network performs the subscriber authentication procedure.

When given SU RF capabilities and location information, the access server is also capable of determining which of multiple, overlapping networks an SU user group is allowed to access. The access server returns a list of accessible networks to the entity requesting the information. In a preferred embodiment, the list is hierarchically ordered based on SU preferences. In another preferred embodiment, the access server also returns other information about the accessible networks (e.g., service rate and/or service quality information) so that the SU can make an intelligent choice about which of the allowed networks to use.

Figure 1:
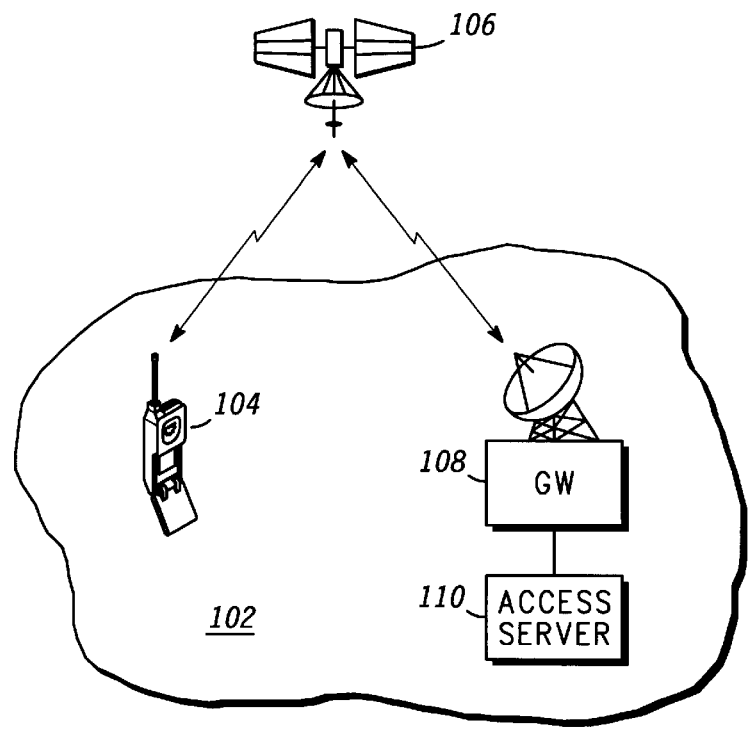
FIG. 1 illustrates a radio telecommunication network which uses an access server to determine whether a subscriber unit (SU) is allowed to access the network in accordance with a preferred embodiment of the present invention.

The method and apparatus of the present invention is particularly useful in two areas of radio telecommunications: network access and hand-off. Network access issues arise when an SU attempts to use a network which is not the SU's home network. FIG. 1 illustrates the utility of the method and apparatus of the present invention in the area of network access.

FIG. 1 illustrates a radio telecommunication network which uses an access server to determine whether an SU is allowed to access the network in accordance with a preferred embodiment of the present invention. Network 100 provides service to an area 102 in which SU 104 is located. The network 100 shown in FIG. 1 is shown as a satellite network for purposes of illustration. However, the method and apparatus of the present invention applies equally well to a ground-based network.

In a preferred embodiment, SU 104 is a radio frequency (RF) telephone, radio, or pager adapted to communicate over networks having differing air interface standards. SU 104 is described in detail in conjunction with FIG. 14.

SU 104 attempts to gain access to network 100 by sending an access request through satellite 106 to Gateway 108 (GW). In a preferred embodiment of the present invention, GW 108 receives the access request and contacts access server 110 to determine whether SU 104 belongs to a group of SU users who are authorized to use the network 100.

Access server 110 evaluates information in the access request which classifies SU. By correlating that information with a database of network-based restrictions, access server can determine whether SU 104 belongs to a group which is denied access to network 100. The process which access server 10 uses to make this determination is described in detail in conjunction with FIG. 9. The access request information and the network-based restrictions are described in detail in conjunction with FIGS. 7 and 8, respectively.

If access server 110 determines that SU 104 is not in a group of users which are excluded from accessing network 100, access server 110 returns that determination to GW 108. GW 108 then performs a subscriber-specific authentication process to determine whether SU 104 as an individual SU is authorized to use network 100.

Figure 2:
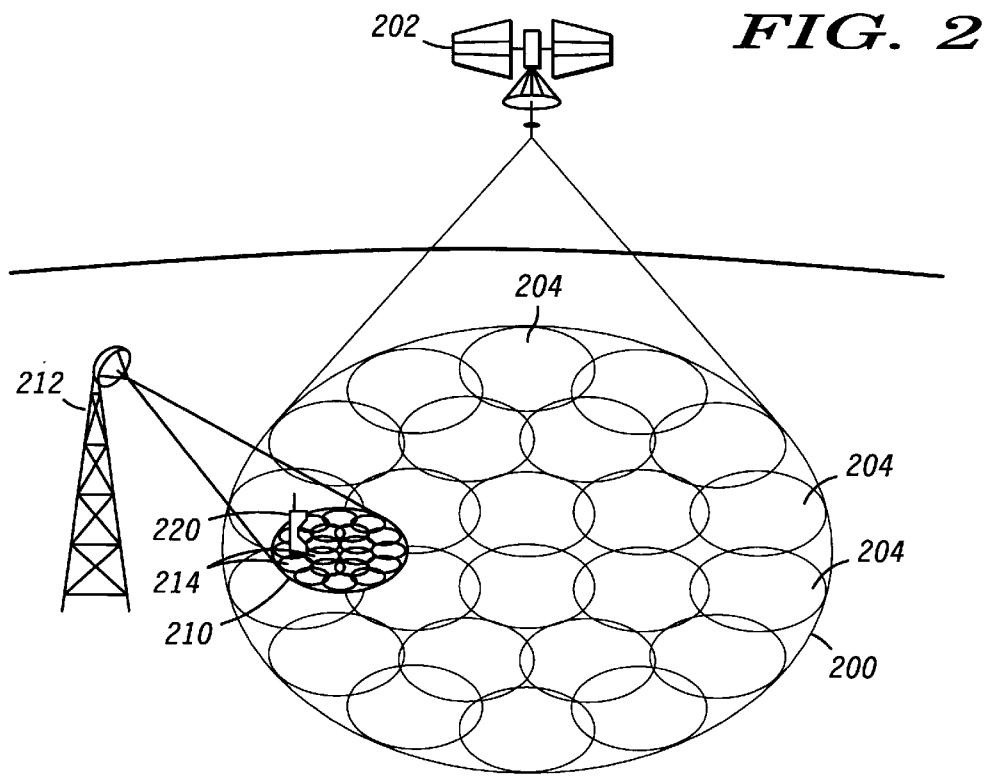
FIG. 2 illustrates a satellite cellular footprint transposed with a terrestrial cellular footprint in accordance with a preferred embodiment of the present invention.
Figure 3:
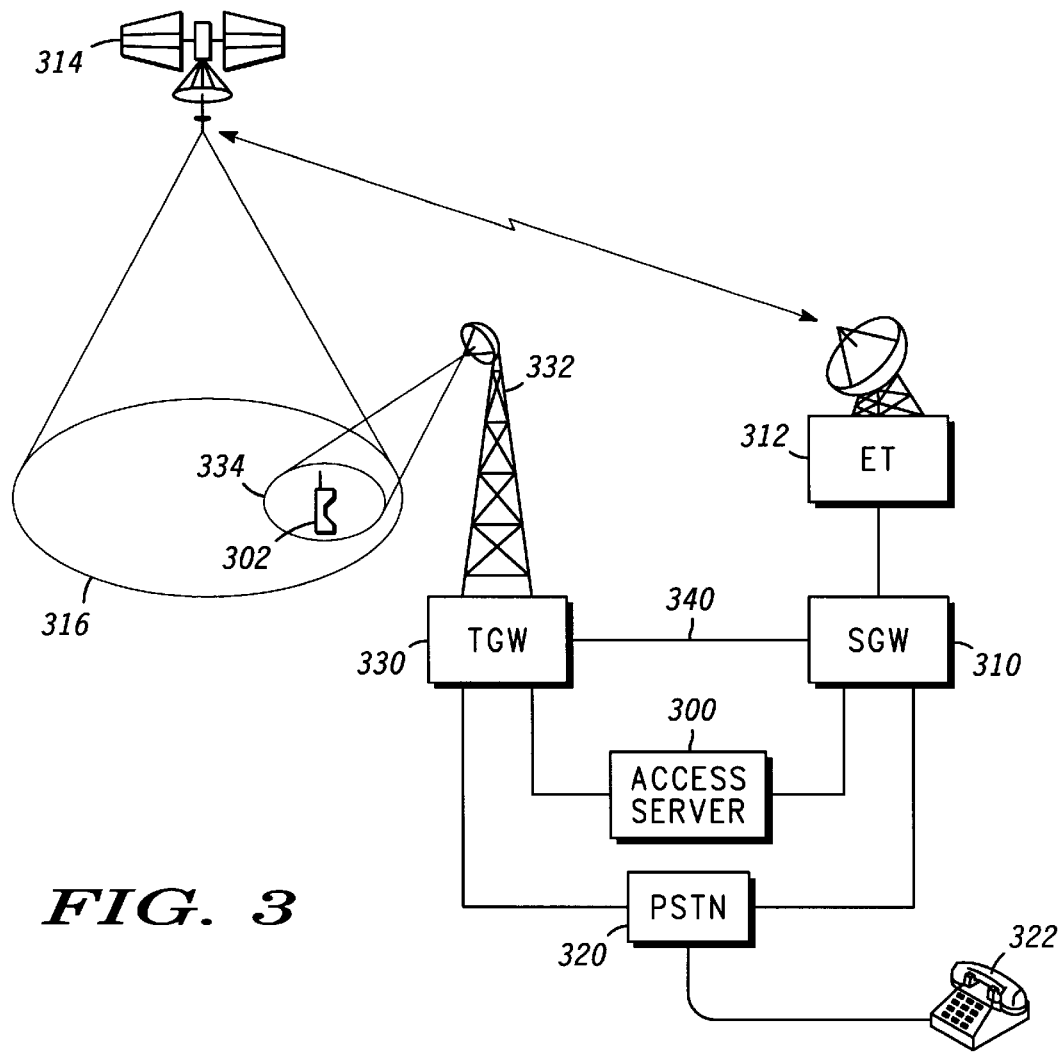
FIG. 3 illustrates a radio telecommunication network which uses an access server in the process or handing-off an SU between multiple networks in accordance with a preferred embodiment of the present invention.

FIGS. 2–3 illustrate the applicability of the network and apparatus of the present invention in enabling hand-offs between overlapping networks. FIG. 2 illustrates satellite cellular footprint 200 with overlapping terrestrial cellular footprint 210 in accordance with a preferred embodiment of the present invention. Satellite cellular footprint 200 is projected by satellite 202 and includes satellite cells 204. Terrestrial cellular footprint 210 is projected by terrestrial antenna 212 and includes terrestrial cells 214. Typically, terrestrial cells 214 are relatively small (e.g., micro-cells or pico-cells which can measure as small as 300 yards or less) when compared with satellite cells 204 (e.g., a satellite cell can measure several hundred miles across).

Subscriber Unit 220 (SU) is located in both satellite cellular footprint 200 and terrestrial cellular footprint 210. SU 220 might wish to hand-off between networks for a variety of reasons. However, SU 220 must not be excluded from the network which SU 220 is handing-off to.

The method and apparatus of the present invention enables a network to inform an SU of all overlapping networks which the SU is allowed to use. In a preferred embodiment, the method and apparatus of the present invention is carried out using an access server which a network can contact to receive a list of networks which an SU is allowed to use.

FIG. 3 illustrates a radio telecommunication network which uses an access server in the process or handing-off an SU between multiple networks in accordance with a preferred embodiment of the present invention. As shown in FIG. 3, both a satellite network and a terrestrial network provide communication cells to SU 302.

In a preferred embodiment, SU 302 is a radio frequency (RF) telephone, radio, or pager adapted to communicate over networks having differing air interface standards. SU 302 is described in detail in conjunction with FIG. 14.

The satellite radio telecommunication network includes satellite gateway 310 (SGW), earth terminal 312 (ET), and satellite 314. SGW 310 is a switching facility which interfaces the satellite network with other communication networks (e.g., PSTN 320 or another radio telecommunication network). SGW 310, thus, enables SU 302 to communicate with conventional telephone 322 and with other communication devices (e.g., RF telephones and pagers).

SGW 310 desirably controls ET 312. ET 312 provides an RF interface between SGW 310 and satellite 314. Satellite 314 provides at least one communication channel to SU 302. In a preferred embodiment, communication channels are provided by projecting beams toward SU 302 which result in footprint 316 on the surface of the earth.

The terrestrial radio telecommunication network includes terrestrial gateway 330 (TGW) and RF antenna 332. TGW 330 is functionally the same as SGW 310. TGW 330 is a switching facility which interfaces the terrestrial network with other communication networks and enables SU 302 to communicate with conventional telephone 322 and with other communication devices.

TGW 330 desirably controls RF antenna 332. RF antenna 332 provides at least one communication channel by projecting beams toward SU 302 which result in footprint 334 on the surface of the earth.

Although both the satellite network and the terrestrial network are capable of providing communication channels to an SU, in the prior art, an SU is unable to use the communication channels of both networks. The reason is that the air interface standards for the two networks differ. A prior art SU does not include the hardware necessary to operate using multiple air interfaces. Multi-mode SUs would have the ability to communicate using more than one air interface standard. Such a multi-mode SU would want to know which overlapping networks the SU has access to, and would want to access or hand-off to the network which has the most desirable qualities.

The method and apparatus of the present invention enables a multi-mode SU to determine which overlapping networks the SU is not excluded from, and also enables the networks to determine the SU access privileges prior to handing-off the SU to another network.

FIG. 3 shows access server 300 connected between SGW 310 and TGW 330. When an access determination is desired, either SGW 310 or TGW 330 can contact access server 300 and provide relevant information (e.g., SU access code and SU location data). Access server 300 will then perform the desired function and supply the result to the network and/or the SU.

Connection 340 is also shown between SGW 310 and TGW 330. This connection 340 is desirable so that SGW 310 and TGW 330 can exchange messages and data. In a preferred embodiment, gateways (GWs) communicate through a packet network (e.g., Signaling System #7) which route messages between GWs. However, in an alternate embodiment, messages and data could be exchanged through access server 300 and connection 340 would be unnecessary.

As shown in FIG. 3, access server 300 provides access information to a satellite network and a terrestrial network. It is important to realize that access server 300 can provide access information to any type and any number of networks.

Figure 4:
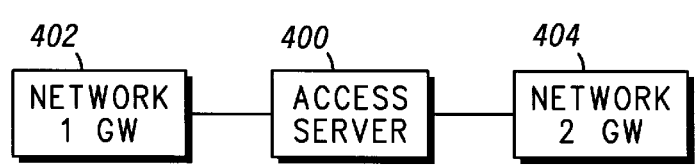
FIG. 4 illustrates an access server and gateway (GW) configuration in accordance with a preferred embodiment of the present invention.
Figure 5:
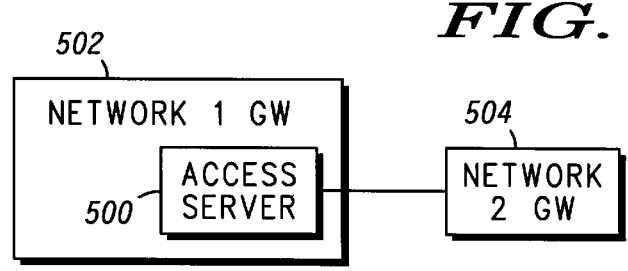
FIG. 5 illustrates an access server and GW configuration in accordance with an alternate embodiment of the present invention.
Figure 6:
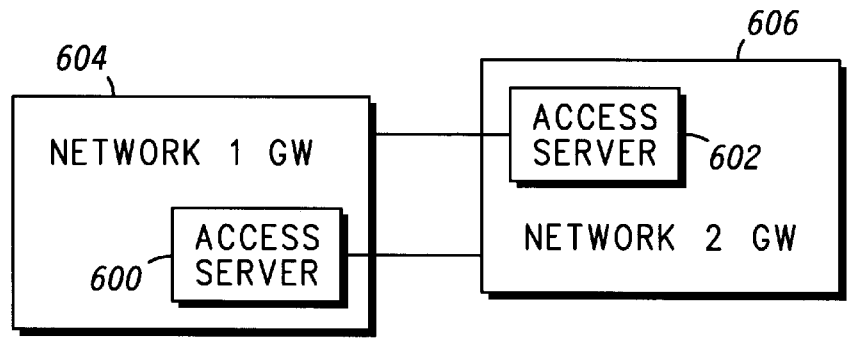
FIG. 6 illustrates an access server and GW configuration in accordance with another alternate embodiment of the present invention.

Access server 300 need not be a separate device which is remotely located from SGW 310 and TGW 330 FIGS. 4-6 illustrate different configurations of an access server and the GWs which it services. FIG. 4 illustrates an access server and GW configuration in accordance with a preferred embodiment of the present invention. In a preferred embodiment, access server 400 is a single, separate device which is not co-located with network 1 GW 402 or network 2 GW 404.

FIG. 5 illustrates an access server and GW configuration in accordance with an alternate embodiment of the present invention. In an alternate embodiment, access server 500 is a single device which is co-located with network 1 GW 502. When either network 1 GW 502 or network 2 GW 504 require access information, they use access server 500 co-located with network 1 GW 502.

FIG. 6 illustrates an access server and GW configuration in accordance with another alternate embodiment of the present invention. In another alternate embodiment, distributed access servers 600, 602 exist within a system of networks. Desirably, distributed access servers 600, 602 are co-located with GWs 604, 606, although this is not necessary. For example, when network 1 GW 604 desires access information, network 1 GW 604 can contact either access server 600 co-located with network 1 GW 604 or access server 602 co-located with network 2 GW 606.

Figure 7:
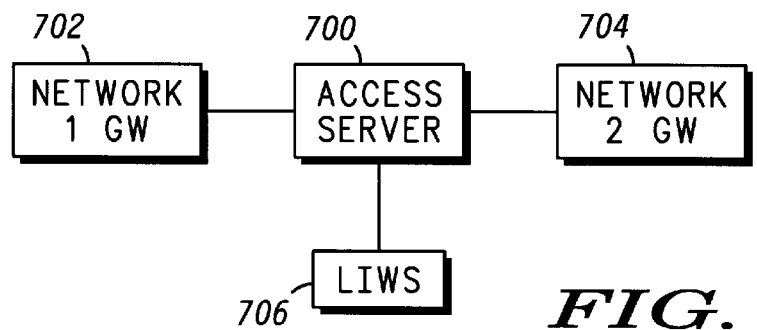
FIG. 7 illustrates an access server, GW, and Location Inter-Working Server (LIWS) configuration in accordance with a preferred embodiment of the present invention.

In a preferred embodiment, an access server can contact a Location Inter-Working Server (LIWS) which is able to convert SU location information from a network-unique locational standard used by one network to a network-unique locational standard used by another network. FIG. 7 illustrates a configuration for access server 700, GW 702, 704, and LIWS 706 in accordance with a preferred embodiment of the present invention. As illustrated, only access server 700 is connected to LIWS 706. Access server 700 is, thus, responsible for contacting LIWS 706 to obtain converted location information. In alternate embodiments, the configurations between GWs 702, 704 and access server 700 could vary as illustrated in FIGS. 4–6. In addition, LIWS 706 can be in a separate or distributed form, similar to access servers depicted in FIGS. 4–6. What is important is that an access server can contact an LIWS to obtain converted location information. The particular access server and LIWS configuration is not critical to the invention.

Although location translation is not critical to the access decision which is described in conjunction with FIG. 1, location translation is critical to hand-off processes which are described in conjunction with FIGS. 2 and 3.

Figure 8:
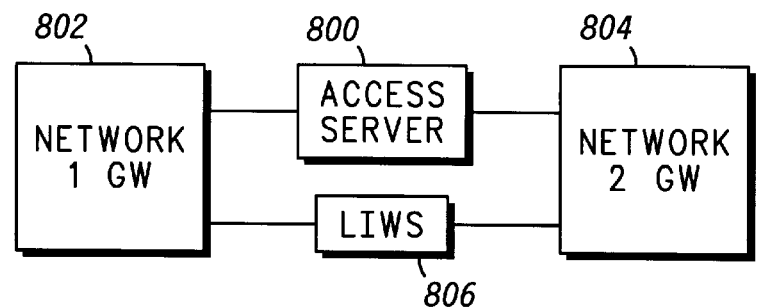
FIG. 8 illustrates an access server, GW, and LIWS configuration in accordance with an alternate embodiment of the present invention.

In alternate embodiments, one or more of a system's GWs can be connected to an LIWS so that the GWs can request converted SU location information. FIG. 8 illustrates a configuration for access server 800, GWs 802, 804, and LIWS 806 in accordance with an alternate embodiment of the present invention. As illustrated, GWs 802, 804 are connected directly to LIWS 806. In this embodiment, GWs 802, 804 can request converted location information from LIWS 806. When necessary, GWs 802, 804 can then forward the converted information to access server 800 for access determination purposes.

In alternate embodiments, the configurations between GWs 802, 804 and access server 800 could vary as illustrated in FIGS. 4–6. In addition, LIWS 806 can be in a separate or distributed form, similar to access servers depicted in FIGS. 4–6. What is important is that a GW can contact an LIWS to obtain converted location information. The particular GW and LIWS configuration is not critical to the invention.

In other alternate embodiments (not shown), both GWs and an access server can connect to an LIWS in a separate or distributed form. In such embodiments, the GWs and access server can request converted location information as needed.

As explained previously, a determination of whether an SU is excluded from contacting a particular network is made by the access server. A network might base an access decision on business, political, and other criteria. For an example of a business access decision, a particular network might deny access to an SU whose home network does not have an agreement with the particular network. A network might make a political access decision, for example, to exclude persons whose service provider is associated with a particular country. Other criteria which are used in an access decision might include the capacity in which the SU user is attempting to use the network. For example, a user might be classified in a commercial user group. The network can refuse to provide service for that particular group. In addition, a network which covers multiple geographical areas (e.g., a global network) might want to base an access decision on licensing restrictions in specific geographical areas.

The access server must obtain information from the SU which the access server can use as access decision criteria. At the time of requesting access to a particular network (i.e., a "visited network"), the SU sends an "access code" to the network. FIG. 9 illustrates an SU access code in accordance with a preferred embodiment of the present invention. SU access code 900 includes home network (HN) field 902, home country (HC) field 904, and access group (AG) field 906. Home network field 902 indicates which service provider is considered the SU's home network. Home country field 904 indicates the home country of the service provider. Access group field 906 indicates in which capacity the SU is attempting to access the network.

Access groups can be, for example, commercial user, emergency user, network operator, or government representative. Commercial users can include any person who is accessing the network for personal reasons, for example. Emergency users might want to access the network in order to report emergencies and request emergency services in the local area. Network operators could include people who want to access the network in order to test equipment. Government representatives could include people who are traveling in the local area for government purposes. The above listed access groups are for exemplary purposes only. More or fewer categories of access groups could be used, depending on the system.

An access server uses the information in home network field 902 to determine whether the visited network and the home network have an agreement to provide service for each others' SUs. The information in home country field 904 is used by the access server to determine whether users whose service providers are associated with that home country will be provided service. Finally, the access server uses the information in the access group field 906 to determine whether the particular group which the SU user is associated will be provided service.

Access code 900 represents a preferred embodiment of the present invention. Depending on message protocols and how many criteria a particular system wants to check when determining access privileges of an SU, access code 900 may contain more, fewer, or different fields. In addition, the order of fields 902–906 can be varied depending on the message protocols of the system.

FIG. 10 illustrates SU access information database 1000 in accordance with a preferred embodiment of the present invention. Access information database 1000 is desirably stored in a memory device which is accessible to the SU. Access information database 1000 includes home network field 1002, home country field 1004, and access group field 1006.

Home network field 1002 contains the SU user's home network which is sent to the access server as part of the access code. Home country field 1004 indicates the home country of the user's service provider which is also sent as part of the access code. Access group field 1006 indicates the access group which the SU user is associated with.

The information shown in the SU access information database 1000 represents a preferred embodiment of the present invention. Depending on message protocols and how many criteria a particular system wants to check when determining access privileges of a particular SU, SU access information database 1000 might contain more, fewer, or different fields.

FIG. 11 illustrates network restriction database 1100 for a particular global or satellite network in accordance with a preferred embodiment of the present invention. In a preferred embodiment, every network which is serviced by an access server has a similar database stored in a memory device accessible by the access server. The access server uses network restriction database 1100 to correlate a received SU access code with the location of the SU to determine whether the SU will be permitted or denied access to various networks.

In a preferred embodiment, network restriction database 1100 is an array of SU locations 1102 and access codes 1104. For each SU location 1102 and access code 1104 combination, network restriction database 100 indicates whether access to the network is permitted or denied. For example, imagine that an SU attempts to access the network associated with network restriction database 1100. The access code sent by the SU indicates that the SU home network (HN) is Spain GSM, the home country (HC) is France, and the access group (AG) is network operator. If the SU is located in China, Russia, or Germany, then access to the network will be permitted. If the SU is located in Canada or Nigeria, then access will be denied. Although SU location is described in terms of a particular country in the example above, SU location information can describe an SU location to a granularity which is much less than a country, and access privileges in these smaller regions can vary within a single country.

The access codes, SU locations, and permit or restrict designations shown in FIG. 11 are for exemplary purposes only. Also, the size of network restriction database 1100 can have more, fewer, or different columns or rows. The format of network restriction database 1100 can be varied in many ways to achieve the benefits of the present invention. The particular format or entries of network restriction database 1100 is not important. What is important is that the access server correlates some criteria which is descriptive of the SU with network requirements in a network restriction database.

Figure 12:
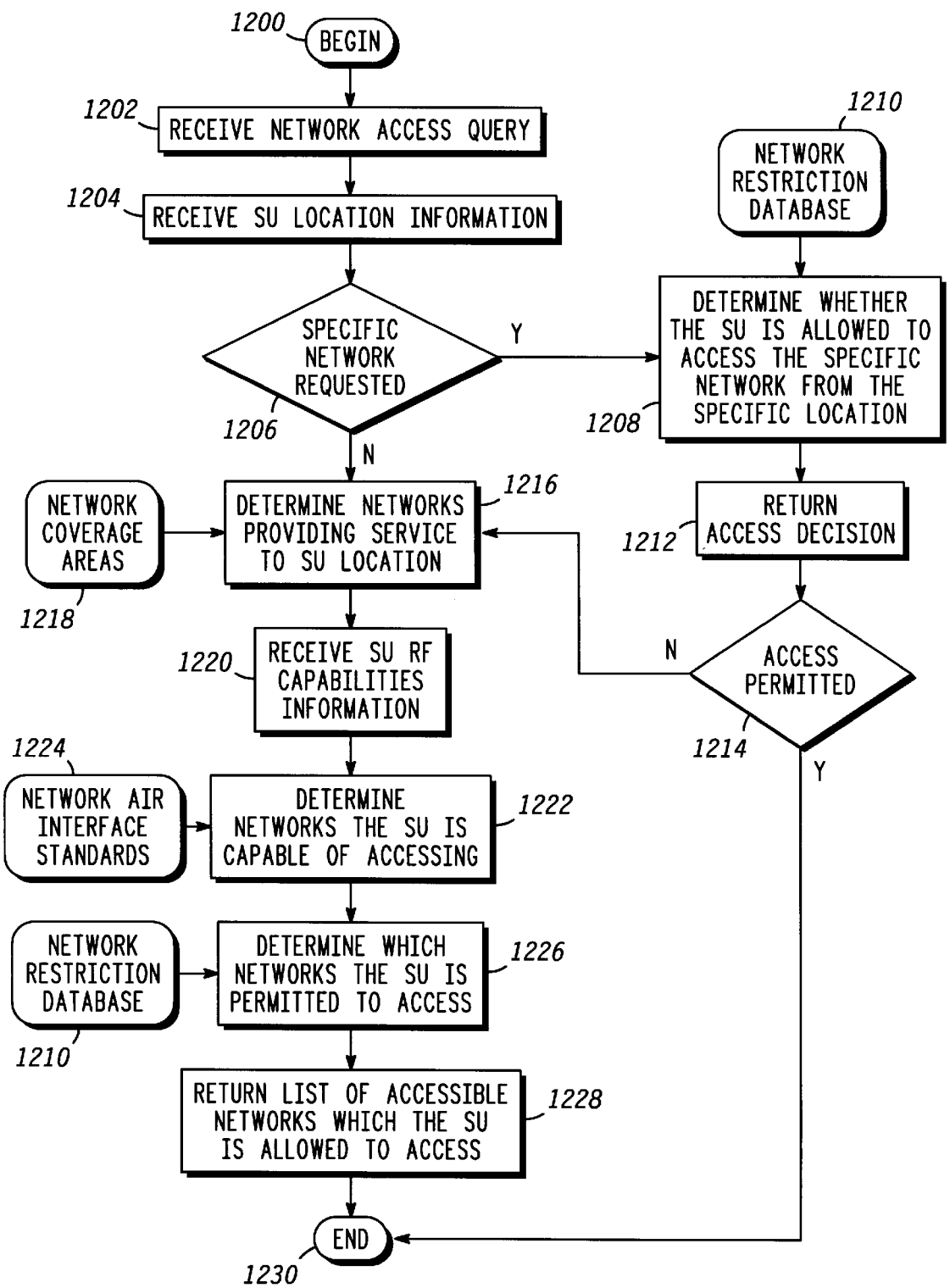
FIG. 12 illustrates a flowchart of a method for an access server to determine SU access privileges in accordance with a preferred embodiment of the present invention.

FIG. 12 illustrates a flowchart of a method for an access server to determine SU access privileges in accordance with a preferred embodiment of the present invention. The method begins 1200 when the access server receives a network access query in step 1202. The network access query indicates that a network needs information about whether a particular SU is allowed to access one or more networks. The request can be GW or SU initiated. In a preferred embodiment, the network access query includes an access code for a particular SU. In an alternate embodiment, the access code can be received in a separate message.

The access server receives SU location information in step 1204. The SU location information indicates the current location of the SU. Generally, the locational standard used will depend on the network which sent the network access query. The SU location can be in the form of a latitude and longitude, for example, or in the form of a particular cell identification. The SU location information can be received in the network access query or as a separate message.

A determination is made in step 1206 whether the network access query indicates that the SU is attempting to access a specific network or whether a list of accessible networks is needed. In a preferred embodiment, when the SU is attempting to access a specific network, the network access query will include an indication of the specific network.

When the SU is attempting to access a specific network, in step 1208, the access server evaluates network restriction database 1210 (e.g., network restriction database 1100, FIG. 11) to determine whether the SU can access the specific network from the SU location. In a preferred embodiment, the access server correlates the access code with the SU location to determine whether access is permitted or restricted. The access server then returns, in step 1212, an access decision to the requester which indicates whether access is permitted or restricted. A determination is made in step 1214 whether the access decision indicates that access is permitted or denied. When access is permitted, the procedure ends 1230.

When access is denied, the access server determines, in step 1216, which networks provide service to the SU location. To make this determination, the access server correlates the SU location with network coverage area information 1218 for each of the networks. Where the SU location intersects a network's coverage area, that network is considered to provide service to the SU location. The access server can use an LIWS to convert SU location information from a network-unique locational standard used by one network to a network-unique locational standard used by another network as described in conjunction with FIG. 7.

In a preferred embodiment, the access server receives SU RF capabilities information in step 1220. The SU RF capabilities information indicates which air interfaces the particular SU is capable of communicating over. The SU RF capabilities information can be received in the network access query or as a separate message.

In step 1222, the access server determines which of the networks from step 1216 the SU has the RF capabilities to communicate with. This determination is made by comparing the SU RF capabilities with network air interface standards 1224 stored at the access server. The purpose of steps 1220 and 1222 is to screen out networks which the SU is incapable of communicating with. In alternate embodiments, the GW or the SU can perform the capabilities-screening function and steps 1220 and 1222 need not be performed by the access server.

Next, the access server determines which of the remaining networks the SU is permitted to access in step 1226. This is accomplished by evaluating the network restriction databases 1210 for the remaining networks. For each network restriction database, the access server determines if the SU's access code is permitted or restricted access in the particular SU location. A list of accessible networks is made from all networks, if any, which permit access to the SU's access code in the particular SU location.

In step 1228, the list of accessible networks which the SU is allowed to access is returned to the requester. The procedure then ends 1230. In a preferred embodiment, the list of accessible networks can be returned to the requester in a prioritized order or with the priority otherwise indicated. The prioritization of the list can be based on which network provides the lowest service rate, the best quality communications, or which network has the most available capacity, for example. Prioritization of the list can depend on preference information from the SU or the GW (e.g., a request to prioritize based on lowest service rate), the order of the RF capabilities in the SU RF capabilities message (e.g., if 900 MHz is a first-listed RF capability, then networks which operate at 900 MHz will be of higher priority), or a default prioritization scheme (e.g., best speech quality is always of highest priority).

In an alternate embodiment, the list of accessible networks is not returned in a prioritized order, but information describing attributes of each network in the list is returned with the list. For example, along with the list of accessible networks, the access server can send information describing the service rate and/or service quality of each of the networks on the list. The SU or GW can then determine which network to attempt to access based on the descriptive information.

In another alternate embodiment, the list of accessible networks is not returned in a prioritized order, and no information is sent which describes the attributes of the networks.

FIG. 12 illustrates access server functions when access information is requested for a specific network, or a list of accessible networks is desired. In alternate embodiments, the access server request can indicate that other access-related information is needed. The method and apparatus of the present invention is not limited to providing access information for a particular SU only. For example, the access server could be asked to provide a list of access codes that are restricted in a particular location. The access server is contemplated to provide any access-related information.

Figure 13:
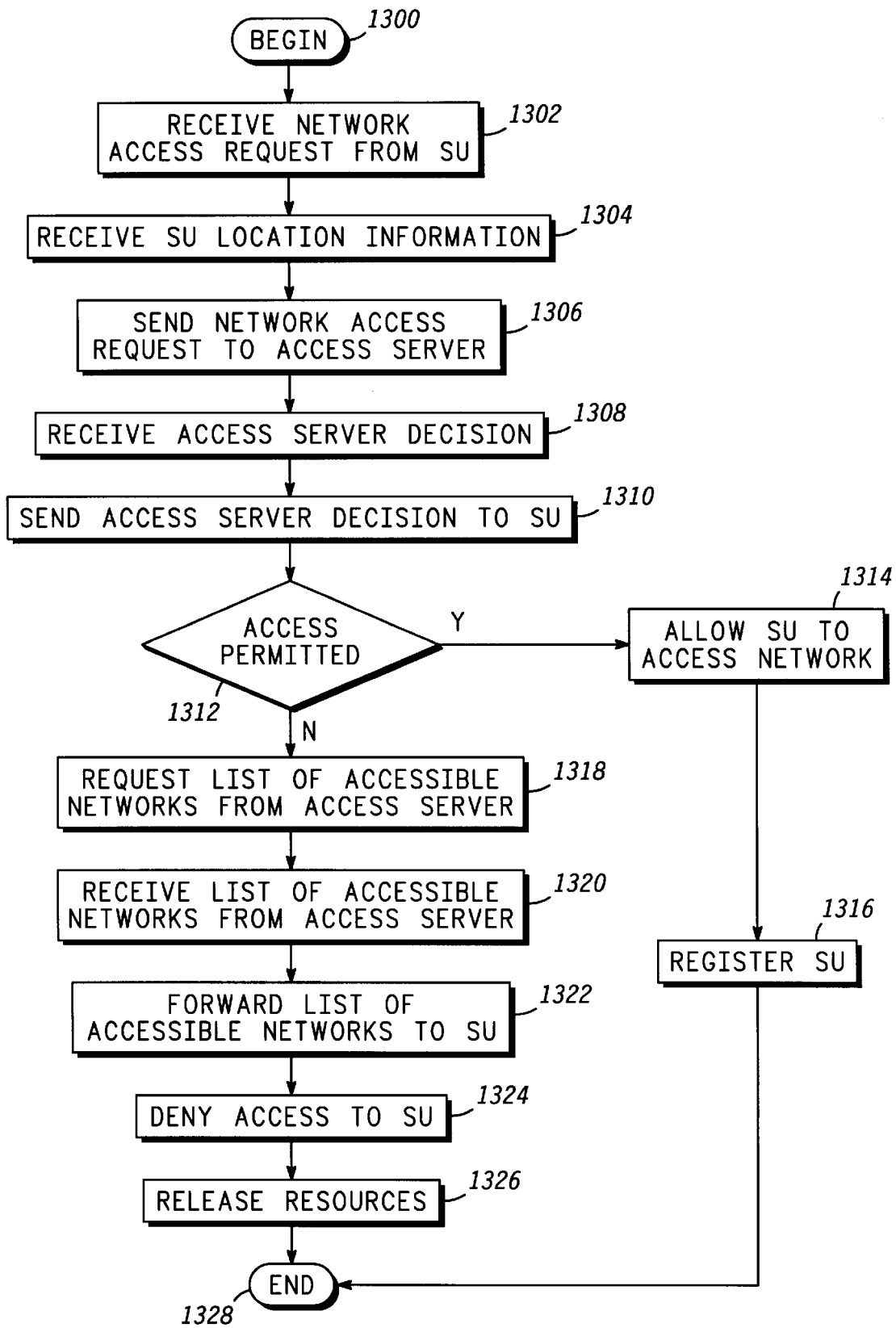
FIG. 13 illustrates a flowchart of a method for a network to support an SU access request in accordance with a preferred embodiment of the present invention.

FIG. 13 illustrates a flowchart of a method for a network to support an SU access request in accordance with a preferred embodiment of the present invention. The method begins 1300 when the network receives a network access request from an SU in step 1302. The network access request indicates that the SU is requesting access to the network.

In a preferred embodiment, the network also receives SU location information from the SU in step 1304. The SU location information can be determined by the SU in several ways, including geolocation, triangularization, or cell identification. In an alternate embodiment, the network has other access to SU location information and does not need to receive the information from the SU in step 1304.

In step 1306, a GW associated with the network sends the network access request to the access server. In a preferred embodiment, the network access request includes the SU location information. In an alternate embodiment, the SU location can be sent in a separate message. The GW may or may not alter the format of the network access request or the SU location information before sending them to the access server. For example, the access server may require all SU location information to be in a particular format. If so, the GW can convert the SU location information to that format using an LIWS prior to sending the information to the access server.

In step 1308, the GW receives an access decision from the access server. The access decision indicates whether access to that particular network is permitted or denied. The GW sends the access decision to the SU in step 1310.

The GW evaluates the access decision in step 1312 to determine whether access is permitted. When access is permitted, the GW allows the SU to access the network in step 1314 and registers the SU in step 1316. The method then ends 1328.

When access is not permitted, the GW requests a list of accessible networks from the access server in step 1318 in a preferred embodiment. A service provider might want to obtain a list of accessible networks for a particular SU when the service provider cannot itself provide service to the SU. Therefore, step 1318 is performed in a preferred embodiment as a service to the SU.

In an alternate embodiment, the access server can automatically send the list of accessible networks when the access server decision indicates that access to the particular network is denied. The list of accessible networks could be sent as part of the access server decision, or in a separate message. In this alternate embodiment, the GW would not be required to request the list of accessible networks in step 1318.

In step 1320, the GW receives a list of accessible networks from the access server. As explained previously, the list of accessible networks indicates which alternative networks the SU is allowed to access from the SU location. At times, there will be no other accessible networks and the access server could send either an empty list, or could send an indicator that no other accessible networks are available to the SU.

The GW forwards the list of accessible networks to the SU in step 1322. At the times when there are no other accessible networks, the GW can instead send an indicator that no other accessible networks exist.

In step 1324, the GW denies access to the network to the SU and the GW releases resources which the SU is using in step 1326. The method then ends 1328.

Figure 14:
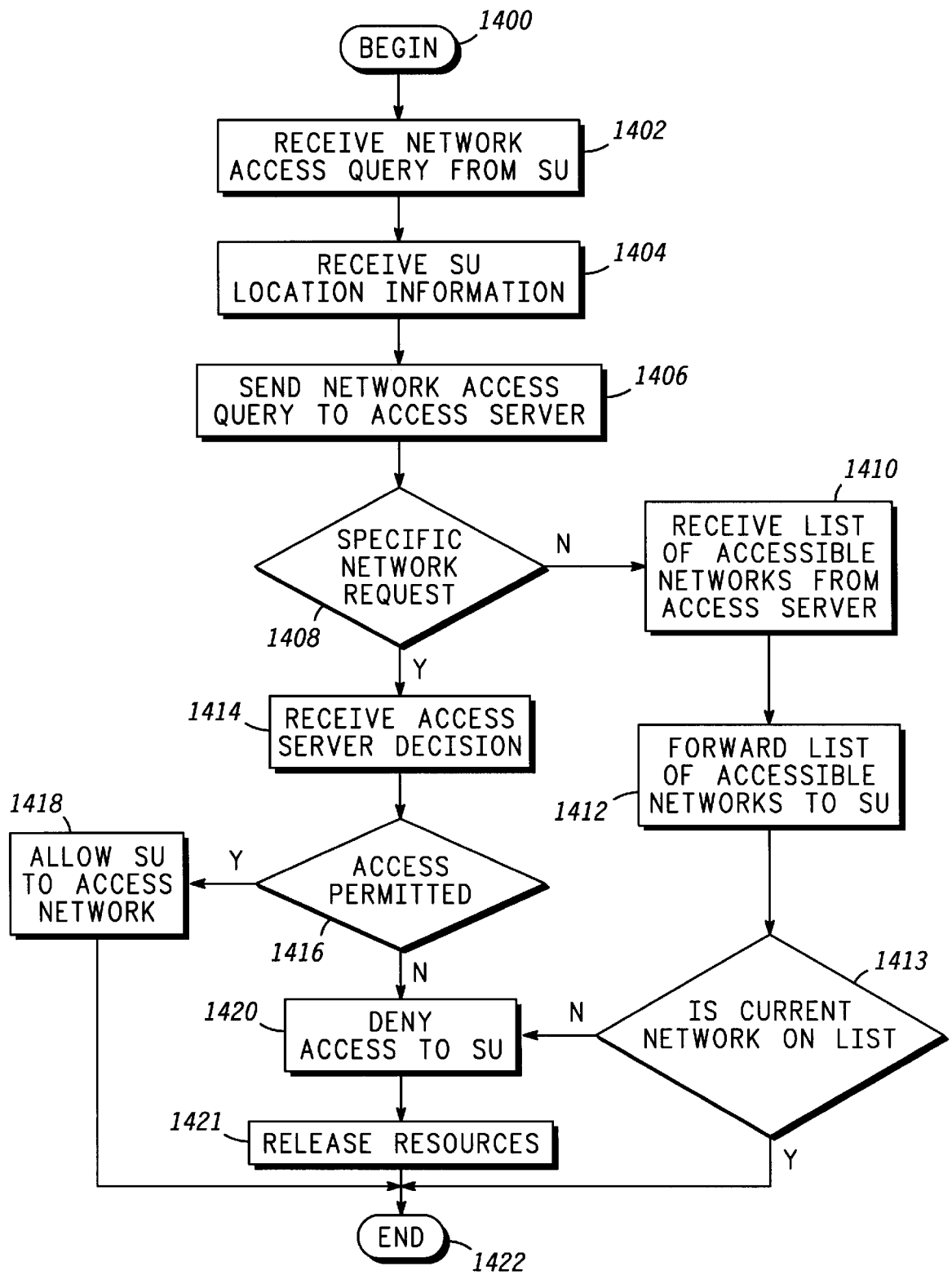
FIG. 14 illustrates a flowchart of a method for a network to support an SU access request in accordance with an alternate embodiment of the present invention.

FIG. 14 illustrates a flowchart of a method for a network to support an SU access request in accordance with an alternate embodiment of the present invention. The method begins 1400 when the network receives a network access query from an SU in step 1402. The network access query can indicate that the SU is requesting access to a specific network, or that the SU is requesting a list of accessible networks from the SU location. In different situations, the network could be the initiator of the network access query and step 1402 would not be performed.

In a preferred embodiment, the network also receives SU location information from the SU in step 1404. The SU location information can be determined by the SU in several ways, including geolocation, triangularization, or cell identification. In an alternate embodiment, the network has other access to SU location information and does not need to receive the information from the SU in step 1404.

In step 1406, a GW associated with the network sends the network access query to the access server. In a preferred embodiment, the network access query includes the SU location information. In an alternate embodiment, the SU location can be sent in a separate message. The GW may or may not alter the format of the network access query or the SU location information before sending them to the access server. For example, the access server may require all SU location information to be in a particular format. If so, the GW can convert the SU location information to that format using an LIWS prior to sending the information to the access server.

In step 1408, the procedure branches when access to a specific network is requested. If no specific network access is requested, the GW receives a list of accessible networks from the access server in step 1410. Unless the GW initiated the access request, the GW then forwards the list of accessible networks to the SU in step 1412. The GW determines, in step 1413, whether the network which the GW is associated with is on the list of accessible networks. If so, the procedure ends 1422. If not, the GW denies access to the SU in step 1420, releases resources allocated to the SU in step 1421, and the procedure ends 1422.

If access to a specific network is requested (step 1408), the GW receives the access server decision in step 1414 as to whether access is permitted or denied. A determination is made in step 1416 whether access is permitted.

If so, the GW allows access to the SU in step 1418 and the procedure ends 1422. Allowing access to the network can be passive (e.g., the network does nothing), or the GW can send a message to the SU indicating that access is allowed. If the GW determines that access is denied, the GW denies access to the SU in step 1420. Denying access to the network can be passive (e.g., the network does nothing), or the GW can send a message to the SU indicating that access is denied. How the SU knows whether access is allowed or denied is a matter of messaging protocols between the network and the SU which can be varied depending on the network involved. If access is denied, then the GW releases resources allocated to the SU in step 1421 and the procedure then ends 1422.

Figure 15:
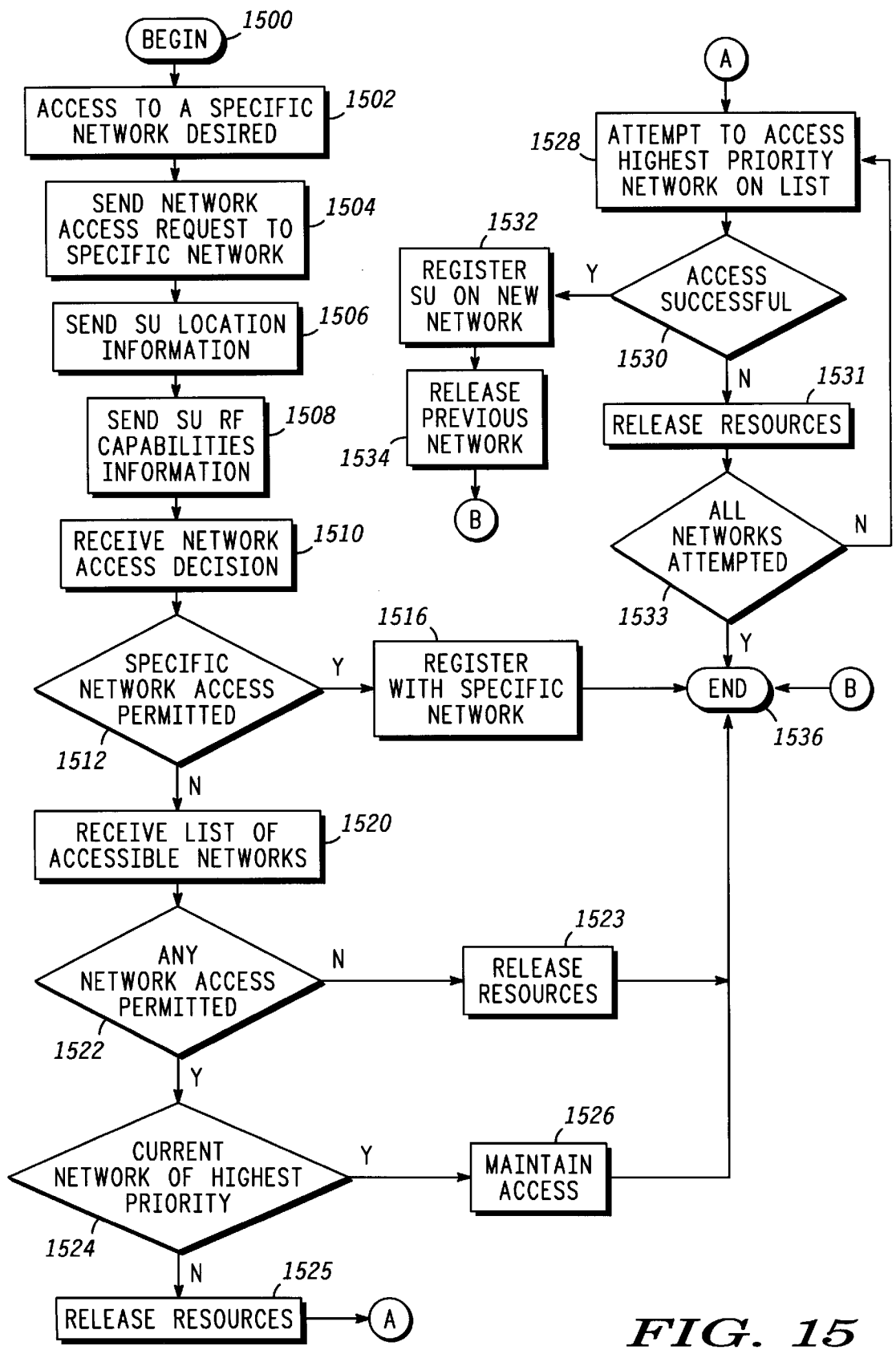
FIG. 15 illustrates a flowchart of a method for an SU to request access to a specific network in accordance with a preferred embodiment of the present invention.

FIG. 15 illustrates a flowchart of a method for an SU to request access to a specific network in accordance with a preferred embodiment of the present invention. The method begins 1500 when the SU determines that access to a specific network is desired in step 1502. The SU could want to access a specific network, for example, if the SU user knows that the specific network has the lowest service rate in the area.

In step 1504, the SU sends a network access request to the specific network which the SU wants to access. The network access request indicates that the SU is requesting access to the specific network. In a preferred embodiment, the SU sends SU location information to the network in step 1506. The SU location information can be sent as part of the network access request or as a separate message. In an alternate embodiment, the network can have prior knowledge of the SU location information and the SU need not send the SU location information in step 1506.

In a preferred embodiment, the SU sends an SU RF capabilities message to the network in step 1508. The SU RF capabilities information can be sent as part of the network access request or as a separate message. In an alternate embodiment, the network can have prior knowledge of the SU RF capabilities information and the SU need not send the SU RF capabilities information in step 1508.

After the access server has determined whether access to the specific network is allowed, the SU receives an access decision in step 1510. The access decision indicates whether access to the specific network is permitted or denied.

The SU evaluates the access decision to determine whether access is permitted in step 1512. If so, the SU then registers with the network in step 1516, if necessary. Registration is necessary, for example, if the network was not the network that the SU last used. The procedure then ends 1536.

If the access server decision indicates that access is denied (step 1512), the SU will receive from the network a list of other accessible networks which the SU is allowed to access in step 1520. At times, there will be no other accessible networks and the SU could receive either an empty list, or could an access indicator that no other accessible networks are available to the SU.

In a preferred embodiment, the list of accessible networks is received by the SU in a prioritized order, or with an indicator of priority. As explained previously, the prioritization of the list can be based on which network provides the lowest service rate, the best quality communications, or which network has the most available capacity, for example. In an alternate embodiment, the list of accessible networks is not returned in a prioritized order, but information describing attributes of each network in the list is returned with the list. In another alternate embodiment, no information indicating priority or attributes is returned with the list.

From the list of accessible networks or the access indicator, the SU determines, in step 1522, whether any network access is permitted. If not, the network releases resources allocated to the SU in step 1523 and the procedure ends 1536.

If so, in a preferred embodiment, the SU determines, in step 1524, whether the network which the SU is currently communicating with, if any, is the alternative accessible network of the highest priority. In an alternate embodiment, where the list is not prioritized, but information describing the attributes of each network on the list is returned, the SU can evaluate these attributes to determine which network it most wants to access.

If the SU determines that the network it is currently communicating with is of the highest priority or has the most desirable attributes, the SU maintains access to that network in step 1526 and the procedure ends 1536.

If the SU determines that the network it is currently communicating with is not of the highest priority or does not have the most desirable attributes, the SU releases the resources of the current network in step 1525 and attempts to access the highest priority network on the list in step 1528. The SU determines whether access to the new network is successful in step 1530. If access is not successful, then the SU releases the resources of the network in step 1531. A determination is made in step 1533 whether access to all networks on the list has be attempted. If so, the procedure ends 1536. If not, then access to the next network on the list is attempted and the procedure iterates as shown in FIG. 15 until access is successful or the list is depleted.

If access is successful (step 1530), the SU registers with the new network in step 1532, if necessary, and the procedure then ends 1536.

Figure 16:
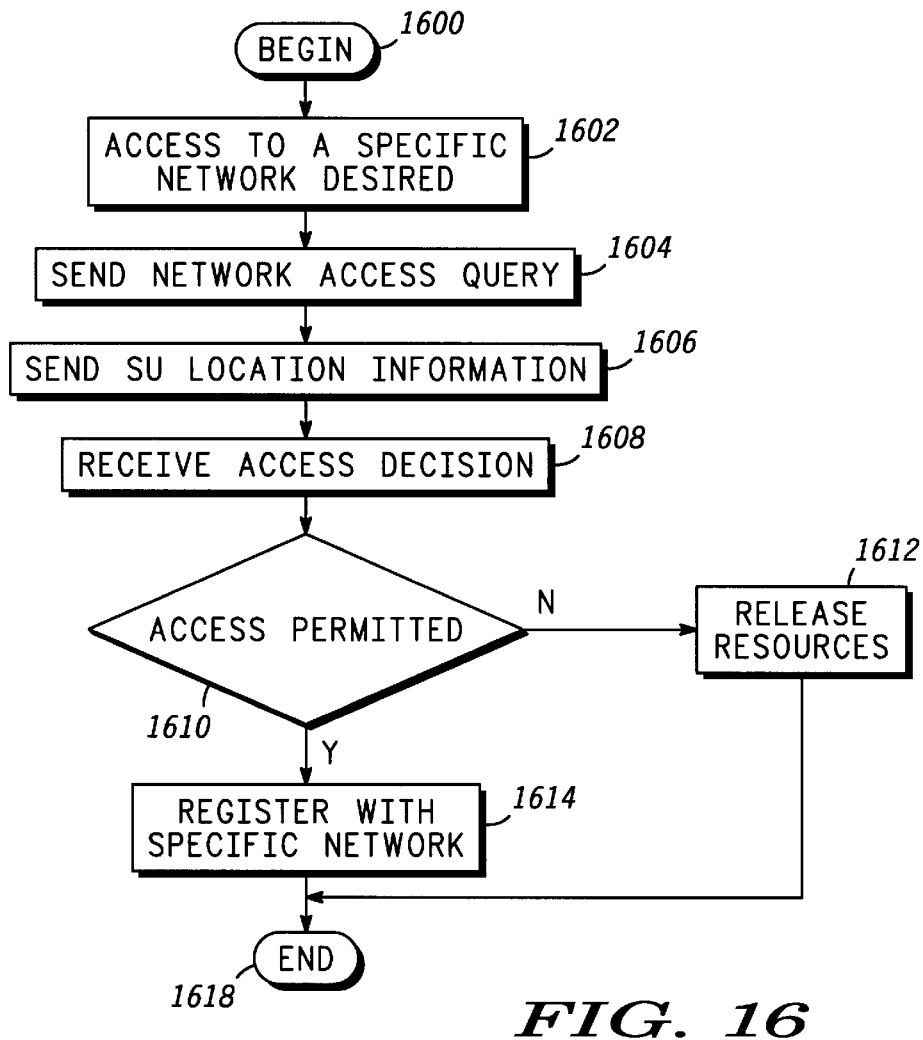
FIG. 16 illustrates a flowchart of a method for an SU to request access to a specific network in accordance with an alternate embodiment of the present invention.

FIG. 16 illustrates a flowchart of a method for an SU to request access to a specific network in accordance with an alternate embodiment of the present invention. The method begins 1600 when the SU determines that access to a specific network is desired in step 1602. The SU could want to access a specific network, for example, if the SU user knows that the specific network has the lowest service rate in the area.

In step 1604, the SU sends a network access query to the network. The network access query indicates that the SU is requesting access to a specific network. In a preferred embodiment, the SU sends SU location information to the network in step 1606. The SU location information can be sent as part of the network access query or as a separate message. In an alternate embodiment, the network can have prior knowledge of the SU location information and the SU need not send the SU location information in step 1606.

After the access server has determined whether access to the specific network is allowed, the SU receives an access decision in step 1608. The access decision indicates whether access to the specific network is permitted or denied.

The SU evaluates the access decision to determine whether access is permitted in step 1610. If not, the SU releases the network resources in step 1612 and the procedure ends 1618. If so, the SU then registers with the specific network in step 1614, if necessary, and the procedure then ends 1618.

Figure 17:
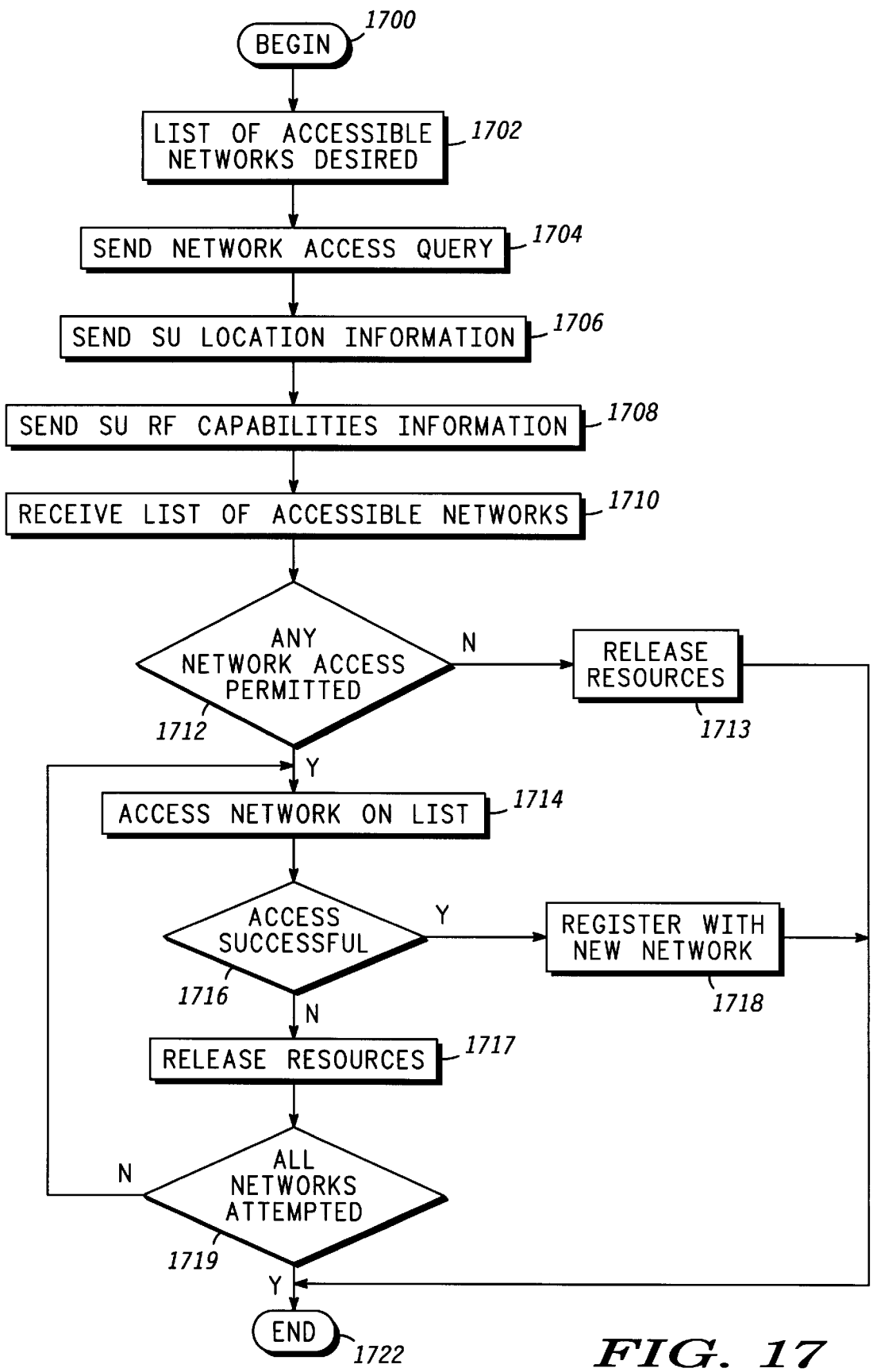
FIG. 17 illustrates a flowchart of a method for an SU to request a list of accessible networks in accordance with an alternate embodiment of the present invention.

FIG. 17 illustrates a flowchart of a method for an SU to request a list of accessible networks in accordance with an alternate embodiment of the present invention. The method begins 1700 when the SU determines that a list of accessible networks is desired in step 1702. A list of accessible networks can be desired, for example, when the SU wants to have a choice of networks which it can access.

The SU sends a network access query to the network in step 1704. The network access query indicates that the SU wants a list of accessible networks. In step 1706, the SU sends location information to the network. The SU location information can be sent as part of the network access query or as a separate message. In an alternate embodiment, the network can have prior knowledge of the SU location information and the SU need not send the SU location information in step 1706.

In a preferred embodiment, the SU sends an SU RF capabilities message to the network in step 1708. The SU RF capabilities information can be sent as part of the network access query or as a separate message. In an alternate embodiment, the network can have prior knowledge of the SU RF capabilities information and the SU need not send the SU RF capabilities information in step 1708.

After the access server has determined accessible networks, the SU receives, in step 1710, the list of accessible networks. In a preferred embodiment, the access server has sorted the list of accessible networks based on SU RF capabilities. In alternate embodiments, the SU or the network sorts the list of accessible networks based on the SU RF capabilities.

A determination is made whether access to any networks is permitted in step 1712. The SU can make this determination, for example, if the received list of accessible networks has no entries. Alternatively, the network or access server could generate a message which indicates that no accessible networks exist in the area. When no network access is permitted, the SU releases the network resources in step 1713 and the procedure ends 1722.

When network access is permitted, the SU attempts to access one of the networks on the list of accessible networks in step 1714. If the list is in a preferential order, the SU can attempt to access the highest-priority network on the list. Otherwise, the SU might have information which indicates the communication quality, service rates, or other information for the networks, and the SU can decide which network to attempt to access based on these criteria.

The SU determines whether the access attempt was successful in step 1716. If the access attempt is not successful, the SU releases the resources of the network in step 1717. The SU then determines whether access to all networks on the list has been attempted in step 1719. If so, the procedure ends 1722. If not, then the SU attempts to access the next network on the list as shown in FIG. 17 until the list is depleted or access is successful.

If the access attempt is successful (step 1716), the SU then registers with the new network in step 1718, if necessary, and the procedure then ends 1722.

The order of the steps shown in FIGS. 12–17 represents different embodiments of the present invention. In alternate embodiments, the orders of the steps can be varied without departing from the scope of the present invention.

FIGS. 12–17 illustrated different embodiments of the method of the present invention. FIGS. 18–21 illustrate different embodiments of the apparatus for an access server, SU, and GW to achieve the advantages of the present invention.

Figure 18:
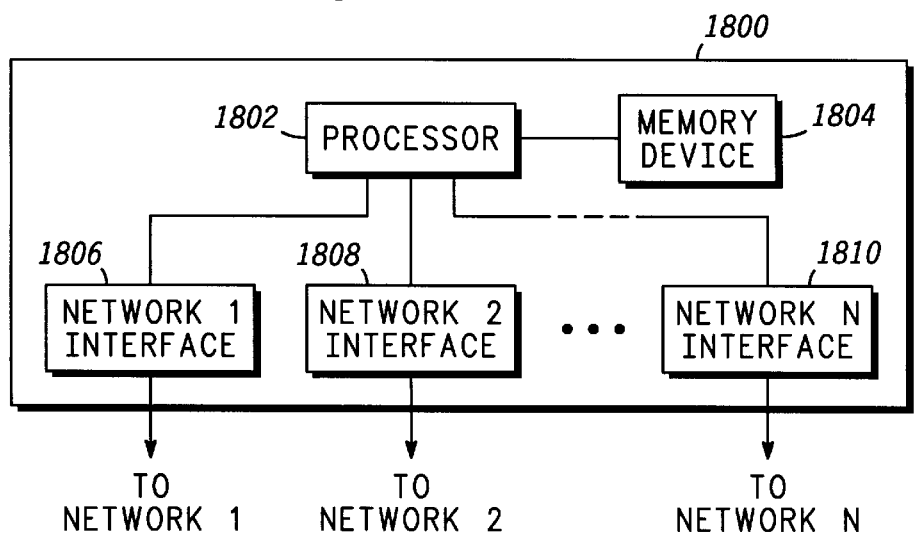
FIG. 18 illustrates an access server in accordance with a preferred embodiment of the present invention.

FIG. 18 illustrates an access server in accordance with a preferred embodiment of the present invention. Access server 1800 includes processor 1802, memory device 1804, and multiple network interfaces 1806–1810. Network interfaces 1806–1810 enable multiple networks to contact access server 1800 to gain network access information. For example, network 1 interface 1806 could connect to a satellite RF network and network 2 interface 1808 could connect to a terrestrial RF network. Although FIG. 18 illustrates three network interfaces 1806–1810, more or fewer network interfaces can be used, depending on how many networks are supported.

Each network interface 1806–1810 is coupled to processor 1802. In a preferred embodiment, network restriction databases, network coverage area information, and network air interface parameters for each network are stored in memory device 1804. This data is updated as needed when each network's information changes. Processor 1802 uses this data to provide network access information to the various networks. The functions performed by processor 1802 have been described in detail in conjunction with FIG. 12.

FIG. 19 illustrates multi-mode SU 1900 in accordance with a preferred embodiment of the present invention. SU 1900 includes processor 1902, memory device 1904, and RF interfaces 1906–1910. Memory device 1904 is coupled to processor 1902 and is used to store information necessary for SU 1900 to inter-work with varying networks, including the SU RF capabilities information.

In a preferred embodiment, processor 1902 can generate a network access request or query and an SU RF capabilities message which indicates which modulation schemes and frequency bands SU is capable of communicating over. Processor 1902 can also generate an SU location information message which contains information describing the location of SU 1900. The information generated by SU 1900 can be included together in messages in various combinations. In a preferred embodiment, the messages are sent to an access server through a GW with which SU 1900 is communicating.

Each RF interface 1906–1910 includes equipment necessary for SU 1900 to communicate using a particular air interface. For example, RF interface 1906 could enable SU 1900 to communicate using GSM in the 900 MHz frequency range. RF interface 1908 could enable SU 1900 to communicate using TDMA in the 1900 MHz frequency range. Although RF interfaces 1906–1910 are shown as separate boxes in FIG. 19, they could alternatively be combined into a single, configurable interface.

FIG. 20 illustrates GW 2000 in accordance with a preferred embodiment of the present invention. GW 2000 represents a GW in either a terrestrial-based or satellite-based network. Although the equipment for differing networks varies, the functionality of GW 2000 in accordance with the present invention is basically the same. GW 2000 includes Base Station Subsystem 2002 (BSS), Mobile Switching Center 2004 (MSC), and location registers 2006. Although BSS and MSC are names of devices familiar to those of skill in the art, the functions of the BSS and MSC for the purposes of this description are explained below. Limitations associated with the use of these names in other contexts are not intended to limit the scope of the present invention.

GW 2000 communicates either directly or indirectly with SUs via RF interface 2008. In a terrestrial network, RF interface 2008 provides a direct link to SUs. In a satellite network, RF interface 2008 communicates with SUs through satellites.

BSS 2002 provides and manages transmission paths between SUs and MSC 2004. MSC 2004 is a point where communications transit between GW 2000 and another network (e.g., a PSTN or other communication network). In a preferred embodiment, location registers 2006 are coupled to MSC 2004. Location registers 2006 are typically one or more memory storage devices which contain the last known locations of SUs supported by the network. An SU location is obtained during a location updating procedure with the SU or after requesting location inter-working information from an LIWS in accordance with a preferred embodiment of the present invention.

In a preferred embodiment, BSS 2002 is coupled to access server 2010 which can be remote or co-located with GW 2000. BSS 2002 relays to access server 2010 a network access query from the SU. BSS 2002 also relays RF capabilities message from the SU which indicates which modulation schemes and frequency bands the SU is capable of communicating over. BSS 2002 also relays to access server 2010 an SU location information message from the SU which contains information describing the location of SU.

In alternate embodiments, GW 2000 has access to SU RF capabilities information and/or location information (e.g., within location registers 2006) and does not need to relay this information to access server 2010 from the SU. In these embodiments, GW 2000 (rather than the SU) might, but is not required to, generate the SU RF capabilities message and/or the SU location information.

Basically, GW 2000 contacts access server 2010 to obtain network access information so that enhanced service can be provided to SUs as described in detail in the description.

FIG. 21 illustrates a GW in accordance with an alternate embodiment of the present invention. In an alternate embodiment, MSC 2004 is connected to access server 2010. Either way, GW 2000 is able to get access information for an SU. BSS 2002 relays to access server 2010 a network access query from the SU. GW 2000 also relays RF capabilities message from the SU which indicates which modulation schemes and frequency bands the SU is capable of communicating over. GW 2000 also relays to access server 2010 an SU location information message from the SU which contains information describing the location of SU.

In summary, the method and apparatus of the present invention enables network access information for multiple networks to be accessed by a GW and/or an SU. The network access information enables an SU to access multiple networks which was not possible with prior-art systems.

What is claimed is:

1. A method for authorizing a subscriber unit (SU) to communicate using one or more radio frequency (RF) networks, the method comprising the steps of:
   a) receiving, by an access server, a network access query from the requesting network, wherein the network access query indicates that the SU would like information regarding access to at least one of multiple RF networks, wherein the multiple RF networks are distinct from each other;
   b) determining whether the SU is permitted to access the at least one of the multiple RF networks by evaluating SU restriction information for the multiple RF networks; and
   c) returning an access decision to the requesting network, wherein the access decision indicates whether the SU is permitted to access the at least one of the multiple RF networks so that the SU can subsequently register with the particular network based on the access decision.

2. The method as claimed in claim 1, wherein the network access query indicates a specific RF network which the SU desires to access, and step b) comprises the step of:
   b1) determining whether the SU is permitted to access the specific RF network by evaluating the SU restriction information for the specific RF network; and
   wherein the step c) comprises the step of:
   c1) returning the access decision which indicates whether access to the specific RF network is permitted.

3. The method as claimed in claim 2, further comprising the step of:
   d) when the determining step b) indicates that the SU is not permitted to access the specific RF network, determining at least one alternative RF network which the SU is permitted to access; and
   wherein the step c) comprises the step of:
   c2) returning the access decision which identifies the at least one alternative RF network which the SU is permitted to access.

4. The method as claimed in claim 1, further comprising the step of:
   d) determining at least one alternative RF network which the SU is permitted to access; and
   wherein the step c) comprises the step of:
   c1) returning the access decision which identifies the at least one alternative RF network which the SU is permitted to access.

5. The method as claimed in claim 4, wherein step d) comprises the step of:
   d1) determining multiple alternative RF networks which the SU is permitted to access; and
   wherein step c1) comprises the step of:
   c1a) returning the access decision which identifies the multiple alternative RF networks which the SU is permitted to access.

6. The method as claimed in claim 1, further comprising the step of:
   d) receiving a user group indicator which indicates which group of multiple group types the SU is classified under;
   wherein the step b) of determining comprises the steps of:
   b1) evaluating each of the at least one of the multiple RF networks to determine which of the at least one of the multiple RF networks permits access to SUs of the group indicated in the user group indicator; and
   b2) determining at least one accessible RF network as those of the at least one of the multiple RF networks which permit access to the SUs of the group.

7. The method as claimed in claim 1, further comprising the steps of:
   d) receiving location information which describes a current location of the SU;
   e) requesting, from a location inter-working server, converted location information which describes the current location of the SU in a format recognized by a particular RF network;
   wherein the step b) of determining further comprises the steps of:
   b1) using the converted location information to determine whether the SU is in an area serviced by the particular RF network; and
   b2) when the converted location information indicates that the SU is not in the area serviced by the particular RF network, determining that the SU is not permitted to access the particular RF network.

8. The method as claimed in claim 1, wherein the step b) of determining comprises the steps of:
   b1) evaluating network air interface information which indicates, for each of the at least one of the multiple RF networks, air interfaces supported by each of the at least one of the multiple RF networks; and
   b2) determining that the SU is not permitted to access a particular RF network when the SU cannot communicate using the air interfaces supported by the particular network.

9. The method as claimed in claim 1, wherein the step b) of determining comprises the steps of:
   b1) evaluating whether a particular RF network has a coverage area which encompasses a current location of the SU; and b2) determining that the SU is not permitted to access the particular RF network when the particular RF network does not have the coverage area which encompasses the current location of the SU.

10. A method for authorizing a subscriber unit (SU) to communicate using one or more radio frequency (RF) networks, the method performed by a requesting network comprising the steps of:
 a) receiving, from the SU, a request to access a particular network of multiple RF networks, wherein the multiple RF networks are distinct from each other;
 b) sending, to an access server, a network access query which indicates that the SU would like information regarding access to the particular network;
 c) receiving, from the access server, an access decision which indicates whether the SU is permitted to access the particular network, wherein the access decision is based on an evaluation by the access server of SU restriction information for the particular network; and
 d) sending information describing the access decision to the SU so that the SU can subsequently register with the particular network based on the access decision.

11. The method as claimed in claim 10, further comprising the step of:
 e) when the access decision indicates that the SU is not permitted access to the particular network, receiving, from the access server, at least one alternate network which the SU is permitted to access; and
 wherein the step d) comprises the step of:
  d1) sending, to the SU, information identifying the at least one alternate network which the SU is permitted to access.

12. The method as claimed in claim 11, further comprising the step of:
 f) requesting, from the access server, the information identifying the at least one alternate network which the SU is permitted to access.

13. The method as claimed in claim 10, further comprising the step of:
 e) sending, to the access server, information describing a current location of the SU; and
 wherein step c) comprises the step of:
  c1) receiving the access decision which is also based on whether the particular network has a coverage area which encompasses the current location of the SU.

14. The method as claimed in claim 13, wherein the information describing the current location of the SU is in a format which is not recognized by the particular network, the method further comprising the steps of:
 f) sending, to a location inter-working server, the information describing the current location of the SU and an identity of the particular network;
 g) receiving, from the location inter-working server, converted location information which describes the current location of the SU in the format which is recognized by the particular network; and
 wherein step e comprises the step of:
  e1) sending, to the access server, the converted location information.

15. The method as claimed in claim 10, further comprising the step of:
 e) sending, to the access server, information describing at least one RF interface standard with which the SU can communicate; and wherein step c) comprises the step of:
  c1) receiving the access decision which is also based on whether the particular network has an RF interface which matches the at least one RF interface standard.

16. A method authorizing a subscriber unit (SU) to communicate using one or more radio frequency (RF) networks, the method performed by a requesting network comprising the steps of:
 a) receiving, from the SU, a network access query which indicates that the SU desires access information about at least one of multiple RF networks, wherein the multiple RF networks are distinct from each other;
 b) sending, to an access server, the network access query;
 c) when the network access query indicates that the SU wants the access information for a particular network, receiving, from the access server, an access decision which indicates whether the SU is permitted to access the particular network, wherein the access decision is based on an evaluation by the access server of SU restriction information for the particular network;
 d) when the network access query indicates that the SU wants the access information for any of the multiple RF networks which the SU is permitted to access, receiving, from the access server, the access decision which includes information describing which of the multiple RF networks the SU is permitted to access, wherein the access decision is based on the evaluation by the access server of the SU restriction information for the multiple RF networks; and
 e) sending information describing the access decision to the SU so that the SU can subsequently register with the particular network based on the access decision.

17. The method as claimed in claim 16, wherein the step d) comprises the step of:
 d1) receiving the access decision which includes information describing identities of multiple networks of the multiple RF networks which the SU is permitted to access; and
 wherein the step e) comprises the step of:
  e1) sending the information describing the identities of the multiple networks to the SU.

18. A method for a subscriber unit (SU) to access a radio frequency (RF) network of one or more RF networks which could be available to the SU, the method performed by the SU comprising the steps of:
 a) sending an access request to a requesting network, wherein the access request indicates that the SU would like to access a specific network of multiple RF networks, and the multiple RF networks are distinct from each other;
 b) receiving a network access decision from the requesting network which indicates whether the SU is permitted access to the specific network, wherein the network access decision was made by an access server which made the network access decision based on whether the SU is in a user group to which the specific network permits access; and
 c) when the network access decision indicates that the SU is permitted to access the specific network, attempting to access the specific network by initiating a registration process with the specific network.

19. The method as claimed in claim 18, further comprising the step of:
 d) when the network access decision indicates that the SU is not permitted to access the specific network, receiving information identifying at least one alternate network which the user group to which the SU belongs is permitted to access.

20. The method as claimed in claim 19, wherein step d) comprises the step of:
   d1) receiving the information identifying at least one alternate network which the user group to which the SU belongs is permitted to access;
   wherein step c) comprises the step of:
      c1) attempting to access a network of the at least one alternate network;
   wherein the method further comprises the steps of:
      e) when an attempt to access the network of the at least one alternate network is not successful, attempting to access another network of the at least one alternate network for which the attempt to access has not yet been made; and
      f) when the attempt to access the another network is not successful, repeating steps c) and e) until attempts to access all of the at least one alternate network have been made.

21. The method as claimed in claim 18, further comprising the step of:
   d) sending, to the requesting network, location information describing a current location of the SU; and
   wherein step b) comprises the step of:
      b1) receiving the network access decision, wherein the network access decision was based on whether the specific network has a coverage area which encompasses the current location.

22. The method as claimed in claim 18, further comprising the step of:
   d) sending, to the requesting network, information describing at least one RF interface over which the SU is capable of communicating; and
   wherein step b) comprises the step of:
      b1) receiving the network access decision, wherein the network access decision was based on whether the specific network uses an RF interface which matches any of the at least one RF interface over which the SU is capable of communicating.

23. A method for a subscriber unit (SU) to access a radio frequency (RF) network of one or more RF networks which could be available to the SU, the method performed by the SU comprising the steps of:
   a) sending a network access query to a requesting network, wherein the network access query indicates that the SU would like information identifying at least one network of multiple RF networks which a user group to which the SU belongs is permitted to access, and wherein the multiple RF networks are distinct from each other;
   b) receiving information identifying the at least one network which the user group to which the SU belongs is permitted to access, wherein the information identifying the at least one network was made by an access server which determined the information based on whether the SU is in the user group to which each of the at least one network permits access; and
   c) attempting to access a network of the at least one network by initiating a registration process with the specific network.

24. The method as claimed in claim 23, wherein step b) comprises the step of:
   b1) receiving the information wherein the at least one network includes multiple alternate networks which the user group to which the SU belongs is permitted to access;
   wherein the method further comprises the steps of:
      d) when an attempt to access the network of the multiple alternate networks is not successful, attempting to access another network of the multiple alternate networks for which the attempt to access has not yet been made; and
      e) when the attempt to access the another network is not successful, repeating steps c) and d) until attempts to access all of the multiple alternate networks have been made.

25. A method for authorizing a subscriber unit (SU) to access a particular network of one or more radio frequency (RF) networks, the method comprising the steps of:
   a) sending, by the SU, a network access query to a requesting network, wherein the network access query indicates that the SU would like information regarding access to at least one of multiple RF networks, wherein the multiple RF networks are distinct from each other;
   b) sending, by the requesting network, the network access query to an access server;
   c) determining, by the access server, whether the SU is permitted to access the at least one of the multiple RF networks by evaluating SU restriction information for the multiple RF networks to determine whether the SU is in a user group to which each of the multiple RF networks allows access;
   d) returning, by the access server, a network access decision which indicates whether the SU is permitted to access any of the multiple RF networks; and
   e) when the network access decision indicates that the SU is permitted to access at least one of the multiple RF networks, the SU attempting to access a network of the at least one of the multiple RF networks by initiating a registration process with a specific network.

26. The method as claimed in claim 25, wherein the step a) comprises the step of:
   a1) sending the network access query, wherein the network access query indicates a particular network of the one or more RF networks which the SU desires to access;
   wherein the step c) comprises the step of:
      c1) determining whether the SU is permitted to access the particular network by evaluating the SU restriction information for the particular network to determine whether the SU is in the user group to which the particular network allows access;
   wherein the step d) comprises the step of:
      d1) returning the network access decision which indicates whether the SU is permitted to access the particular network; and
   wherein step e) comprises the step of:
      e1) the SU attempting to access the particular network when the network access decision indicates that the SU is permitted to access the particular network.

27. The method as claimed in claim 25, wherein the step a) comprises the step of:
   a1) sending the network access query, wherein the network access query indicates that the SU wants information identifying at least one alternate network to which the SU is permitted access;
   wherein the step c) comprises the step of:
      c1) determining whether the SU is permitted to access each of the at least one of the multiple networks by evaluating the SU restriction information for each of the at least one of the multiple networks to determine whether the SU is in the user group to which each of the at least one of the multiple networks allows access; wherein the step d) comprises the step of:

d1) returning the network access decision which identifies the at least one alternate network to which the SU is permitted the access; and wherein step e) comprises the step of:

e1) the SU attempting to access a network of the at least one alternate network.

28. An access server for determining whether a subscriber unit (SU), which is in a particular SU group, is permitted to access any network of multiple radio frequency (RF) networks, the access server comprising:

a processor for receiving a network access query from a requesting network of the multiple RF networks, wherein the multiple RF networks are distinct from each other, and wherein the network access query indicates that the SU would like information regarding access to at least one of the multiple RF networks, determining whether the SU is permitted to access any of the multiple RF networks by evaluating SU restriction information for the multiple RF networks, wherein the SU restriction information indicates whether the particular SU group is an SU group that is allowed access to any of the multiple RF networks, the processor also for returning an access decision to the requesting network so that the SU can subsequently register with the particular network based on the access decision, wherein the access decision indicates whether the SU is permitted to access at least one of the multiple RF networks;

a memory device coupled to the processor for storing the SU restriction information for each of the multiple RF networks; and at least one network interface coupled to the processor for enabling communication between the access server and the requesting network.

29. The access server as claimed in claim 28, wherein the processor is further for determining an identity of at least one alternate network which the SU group to which the SU belongs is permitted access, and returning the access decision to the requesting network with the identity of the at least one alternate network.

30. The access server as claimed in claim 28, wherein the processor is also for receiving information describing a current location of the SU, evaluating whether each of the one or more RF networks has a coverage area which encompasses the current location of the SU, and determining that the SU is not permitted to access a particular RF network when the particular RF network does not have the coverage area which encompasses the current location of the SU.

31. The access server as claimed in claim 30, wherein the processor is further for contacting a location inter-working server to convert the current location of the SU from a first format to a second format which is used by the particular network.

32. The access server as claimed in claim 28, wherein the processor is further for receiving information describing at least one air interface supported by the SU, evaluating whether each of the at least one of the multiple RF networks uses the at least one air interface, and determining that the SU is not permitted to access a particular RF network when the particular RF network does not use the at least one air interface.

33. A subscriber unit (SU) for communicating using multiple radio frequency (RF) networks which are separate from each other, the SU comprising:

a processor for sending an access request to a requesting network of the multiple RF networks, wherein the one or more RF networks are distinct from each other, and wherein the access request indicates that the SU would like to access a specific network of the multiple RF networks, receiving a network access decision from the requesting network which indicates whether the SU is permitted access to the specific network, wherein the network access decision was made by an access server which made the network access decision based on whether the SU is in a user group to which the specific network permits access, and, when the network access decision indicates that the SU is permitted to access the specific network, the SU for attempting to access the specific network by initiating a registration process with a specific network; and at least one RF interface coupled to the processor for enabling the SU to communicate using multiple air interfaces.

34. The SU as claimed in claim 33, wherein the at least one RF interface comprises multiple RF interfaces, wherein each of the multiple RF interfaces is configured to operate using a particular air interface.

35. The SU as claimed in claim 33, wherein the at least one RF interface comprises an RF interface which is configurable to support communications using the multiple air interfaces.

36. The SU as claimed in claim 33, further comprising:

a memory device coupled to the processor for storing information describing the multiple air interfaces which the SU is capable of supporting.

37. A gateway for enabling a subscriber unit (SU) to access multiple radio frequency (RF) networks, the gateway comprising:

an RF interface for receiving, from the SU, a request to access a particular network of the multiple RF networks, wherein the multiple RF networks are distinct from each other; and a processor coupled to the RF interface for sending, to an access server, a network access query which indicates that the SU would like information regarding access to the particular network, the gateway also for receiving, from the access server, an access decision which indicates whether the SU is permitted to access the particular network, wherein the access server based the access decision on an evaluation of SU restriction information for the particular network, and for sending information describing the access decision to the SU so that the SU can subsequently register with the particular network based on the access decision.

38. The gateway as claimed in claim 37, further comprising the access server coupled to the processor.

39. A communication network comprising:

at least one subscriber unit (SU) adapted to communicate with multiple radio frequency (RF) networks which are separate from one another, wherein the multiple RF networks are distinct from each other, the at least one SU for sending an access request to a gateway of the communication network, wherein the access request indicates that the SU would like to access a specific network of the multiple RF networks, for receiving a network access decision from the gateway which indicates whether the SU is permitted access to the specific network, wherein the network access decision was made by an access server which made the network access decision based on whether the SU is in a user group to which the specific network permits access, and, when the network access decision indicates that the SU is permitted to access the specific network, the at least one SU also for attempting to access the specific network by initiating a registration process with the specific network; and at least one gateway which communicates with the at least one SU using a particular RF interface, the at least one gateway for receiving the access request from the SU, sending the access request to the access server, receiving the network access decision from the access server, and informing the at least one SU whether the network access decision indicates that the at least one SU is permitted to access the specific network.

40. The communication network as claimed in claim 39, further comprising at least one satellite which provides an RF link between the at least one SU and the at least one gateway.

41. A system for authorizing a subscriber unit (SU) means to communicate using one or more radio frequency (RF) networks, the system comprising:

the SU means for sending an access request to a requesting network, receiving a network access message from the requesting network which indicates whether the SU means is permitted access to a particular network of multiple RF networks, wherein the multiple RF networks are distinct from each other, and, when the network access message indicates that the SU means is permitted to access the particular network, the SU means for attempting to access the particular network by initiating a registration process with the particular network;

access server means for receiving a network access query from the requesting network, wherein the network access query indicates that the SU means would like information regarding access to at least one of the multiple RF networks, for determining whether the SU means is permitted to access any of the multiple RF networks by evaluating SU restriction information for the multiple RF networks, the access server means also for returning an access decision to the requesting network, wherein the access decision indicates whether the SU means is permitted to access the particular network; and gateway means, in communication contact with the SU means and the access server means, for receiving, from the SU means, the access request and for sending, to the access server means, the network access query based on the access request, the gateway means also for receiving, from the access server means, the access decision and for sending the network access message describing the access decision to the SU means so that the SU means can subsequently register with the particular network based on the access decision.

* * * * *